United States Patent
Yeh et al.

(10) Patent No.: US 10,603,564 B2
(45) Date of Patent: Mar. 31, 2020

(54) INTERACTIVE COMPONENT FOR AN AMUSEMENT PARK

(71) Applicant: Universal City Studios LLC, Universal City, CA (US)

(72) Inventors: Wei Cheng Yeh, Orlando, FL (US); Travis Jon Cossairt, Celebration, FL (US)

(73) Assignee: Universal City Studios LLC, Universal City, CA (US)

( * ) Notice: Subject to any disclaimer, the term of this patent is extended or adjusted under 35 U.S.C. 154(b) by 148 days.

(21) Appl. No.: 15/861,502

(22) Filed: Jan. 3, 2018

(65) Prior Publication Data

US 2019/0201768 A1    Jul. 4, 2019

(51) Int. Cl.
*A63G 31/00*    (2006.01)
*A63B 69/20*    (2006.01)
(Continued)

(52) U.S. Cl.
CPC ............ *A63B 69/32* (2013.01); *A63B 69/205* (2013.01); *A63G 31/00* (2013.01); *A63G 33/00* (2013.01);
(Continued)

(58) Field of Classification Search
CPC ...... A63G 31/00; A63G 31/007; A63G 31/02; A63G 31/04
(Continued)

(56) References Cited

U.S. PATENT DOCUMENTS 5,946,444 A    8/1999    Evans et al.
6,122,846 A    9/2000    Gray et al.
(Continued)

FOREIGN PATENT DOCUMENTS

JP    2003288472 A    10/2003
JP    2004126791 A    4/2004
(Continued)

OTHER PUBLICATIONS

U.S. Appl. No. 15/874,671, filed Jan. 18, 2018, Wei Cheng Yeh.
(Continued)

*Primary Examiner* — Kien T Nguyen
(74) *Attorney, Agent, or Firm* — Fletcher Yoder, P.C.

(57) ABSTRACT

An entertainment system has an interactive component for an amusement park. The interactive component includes a detection device disposed within a housing and configured to read an identification tag via long range and short range radio communications, an interactive sensor disposed within the housing and configured to detect physical interaction with a portion of the interactive component, a control device communicatively coupled to the detection device and the interactive sensor, where the control device is configured to receive feedback from the detection device and the interactive sensor, an effect device configured to receive a signal from the control device and to generate an effect based on detection of the physical interaction, and a transmitter configured to transmit data to the identification tag based on detection of the physical interaction with the portion of the interactive component while detecting the identification tag within a threshold distance of the interactive component.

20 Claims, 4 Drawing Sheets

(51) Int. Cl.
    *A63B 69/32*     (2006.01)
    *H04L 29/08*     (2006.01)
    *H04W 4/80*     (2018.01)
    *A63G 33/00*     (2006.01)
    *A63B 69/30*     (2006.01)

(52) U.S. Cl.
    CPC ............ *H04L 67/306* (2013.01); *H04W 4/80* (2018.02); *A63B 2220/53* (2013.01); *A63B 2220/833* (2013.01)

(58) Field of Classification Search
    USPC .......................... 472/117, 128; 446/175, 284
    See application file for complete search history.

(56) References Cited

U.S. PATENT DOCUMENTS

| | | |
|---|---|---|
| 6,142,368 A | 11/2000 | Mullins et al. |
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,524,246 B2 * | 4/2009 | Briggs .................. A63F 7/2472 273/440 |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |

(56) References Cited

U.S. PATENT DOCUMENTS

| | | |
|---|---|---|
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |
| 9,225,372 B2 | 12/2015 | Butler |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 1,001,079 A1 | 7/2018 | Weston et al. |
| 1,002,262 A1 | 7/2018 | Barney et al. |
| 2006/0258471 A1 | 11/2006 | Briggs et al. |
| 2007/0066396 A1 | 3/2007 | Weston et al. |
| 2008/0062052 A1 | 3/2008 | Suzuki et al. |
| 2008/0082025 A1 | 4/2008 | Hughes et al. |
| 2009/0048039 A1 | 2/2009 | Holthouse et al. |
| 2009/0189749 A1 | 7/2009 | Salada |
| 2010/0160054 A1 | 6/2010 | Henry |
| 2012/0286938 A1 | 11/2012 | Cote et al. |
| 2013/0324059 A1 | 12/2013 | Lee et al. |
| 2014/0122170 A1 | 5/2014 | Padgett et al. |
| 2014/0135137 A1 | 5/2014 | Heaven et al. |
| 2014/0162693 A1 | 6/2014 | Wachter et al. |
| 2014/0251027 A1 | 9/2014 | Hsieh |
| 2015/0046202 A1 | 2/2015 | Hunt |
| 2015/0078140 A1 | 3/2015 | Riobo Aboy et al. |
| 2015/0101417 A1 | 4/2015 | Carroll et al. |
| 2015/0128728 A1 | 5/2015 | Salo et al. |
| 2015/0133229 A1 | 5/2015 | Weston et al. |
| 2015/0138556 A1 | 5/2015 | LeBoeuf et al. |
| 2015/0194817 A1 | 7/2015 | Lee et al. |
| 2015/0236551 A1 | 8/2015 | Shearer et al. |
| 2015/0255226 A1 | 9/2015 | Rouvala et al. |
| 2015/0312517 A1 | 10/2015 | Hoyt et al. |
| 2015/0330749 A1 | 11/2015 | Miller |
| 2015/0336013 A1 | 11/2015 | Stenzler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0067600 A1 | 3/2016 | Barney et al. |
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0307398 A1 | 10/2016 | Walker et al. |
| 2016/0313097 A1 | 10/2016 | Miller et al. |
| 2016/0321548 A1 | 11/2016 | Ziskind et al. |
| 2016/0373522 A1 | 12/2016 | Carlos et al. |
| 2017/0091850 A1 | 3/2017 | Alvarez et al. |
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |

(56) References Cited

U.S. PATENT DOCUMENTS

| | | |
|---|---|---|
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0008897 A1 | 1/2018 | Ackley et al. |
| 2018/0014385 A1 | 1/2018 | Wein |
| 2018/0078853 A1 | 3/2018 | Barney et al. |
| 2018/0214769 A1 | 8/2018 | Briggs et al. |
| 2018/0318723 A1 | 11/2018 | Weston |
| 2018/0339226 A1 | 11/2018 | Barney et al. |

FOREIGN PATENT DOCUMENTS

| | | |
|---|---|---|
| JP | 2005267179 A | 9/2005 |
| JP | 2010000178 A | 1/2010 |
| JP | 2012244846 A | 12/2012 |
| JP | 2013188019 A | 9/2013 |
| JP | 6152919 B1 | 6/2017 |
| KR | 20080079835 A | 9/2008 |

OTHER PUBLICATIONS

U.S. Appl. No. 15/882,761, filed Jan. 29, 2018, Wei Cheng Yeh.
U.S. Appl. No. 15/882,721, filed Jan. 29, 2018, Wei Cheng Yeh.
U.S. Appl. No. 15/882,788, filed Jan. 29, 2018, Wei Cheng Yeh.
U.S. Appl. No. 15/882,738, filed Jan. 29, 2018, Travis Jon Cossairt.
U.S. Appl. No. 15/972,940, filed May 7, 2018, Unavailable.
U.S. Appl. No. 15/995,633, filed Jun. 1, 2018, Unavailable.
U.S. Appl. No. 16/196,967, filed Nov. 20, 2018, Matthew Usi.
U.S. Appl. No. 15/826,357, filed Nov. 29, 2017, Wei Yeh.
U.S. Appl. No. 15/833,839, filed Dec. 6, 2017, Travis Jon Cossairt.
PCT/US2018/065757 Invitation to Pay Additional Fees dated Feb. 20, 2019.
PCT/US2018/065757 Search Report and Written Opinion dated May 27, 2019.

* cited by examiner

INTERACTIVE COMPONENT FOR AN AMUSEMENT PARK

BACKGROUND

The present disclosure relates generally to the field of amusement parks. More specifically, embodiments of the present disclosure relate to an interactive component for an amusement park.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks contain a variety of rides providing unique experiences to each park guest. The addition of large attractions, such as rides and shows, generally provides an amusement park with additional capacity to handle a larger number of guests. However, such attractions tend to draw more visitors and become hubs for guest traffic. Further, the addition of traditional rides without an added layer of intrigue may be insufficient to garner sufficient guest interest to address either guest traffic issues or provide an advantage over competitors. In some cases, amusement parks may include a variety of interactive features that are utilized to entertain park guests when waiting for and/or travelling between the large attractions. With the increasing sophistication and complexity of modern attractions, and the corresponding increase in expectations among amusement park and/or theme park guests, improved and more creative attractions are needed, including attractions that provide a more interactive and personalized experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, an entertainment system having an interactive component for an amusement park, where the interactive component includes a detection device disposed within a housing and configured to read an identification tag via long range and short range radio communications, an interactive sensor disposed within the housing and configured to detect physical interaction with a portion of the interactive component, a control device communicatively coupled to the detection device and the interactive sensor, where the control device is configured to receive feedback from the detection device and the interactive sensor, an effect device configured to receive a signal from the control device and to generate an effect based on detection of the physical interaction with the portion of the interactive component, and a transmitter configured to transmit data to the identification tag based on detection of the physical interaction with the portion of the interactive component while detecting the identification tag within a threshold distance of the interactive component.

In another embodiment, a system includes an interactive component disposed in an environment of an amusement park. The interactive component includes a detection device configured to communicate with a guest identification tag, an interactive sensor configured to detect a physical proximity from and/or interaction with a portion of the interactive component, a control device communicatively coupled to the detection device and the interactive sensor, where the control device is configured to receive feedback from the detection device and the interactive sensor, and where the control device is configured to award a point to a guest profile associated with the guest identification tag upon detection of the interaction with the portion of the interactive component while the guest identification tag is within a threshold proximity, an effect device configured to receive a signal from the control device to generate an effect upon detection of the interaction with the portion of the interactive component, a display disposed in the environment of the amusement park, and a control system of the amusement park communicatively coupled to the control device of the interactive component, where the control system is configured to send one or more signals to the display to display information based on the point awarded to the guest profile.

In another embodiment, a method includes identifying, using a detection device, a guest device approaching an interactive component disposed in an environment of an amusement park, detecting, using an interactive sensor, interaction with the interactive component associated with the identified guest device while detecting, using the detection device, a presence of the guest device within a threshold distance relative to a point of the interactive component, and generating, using an effect device, an effect based on the interaction with the interactive component associated with the guest device while detecting the presence of the identified guest device within the threshold distance relative to the point of the interactive component.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
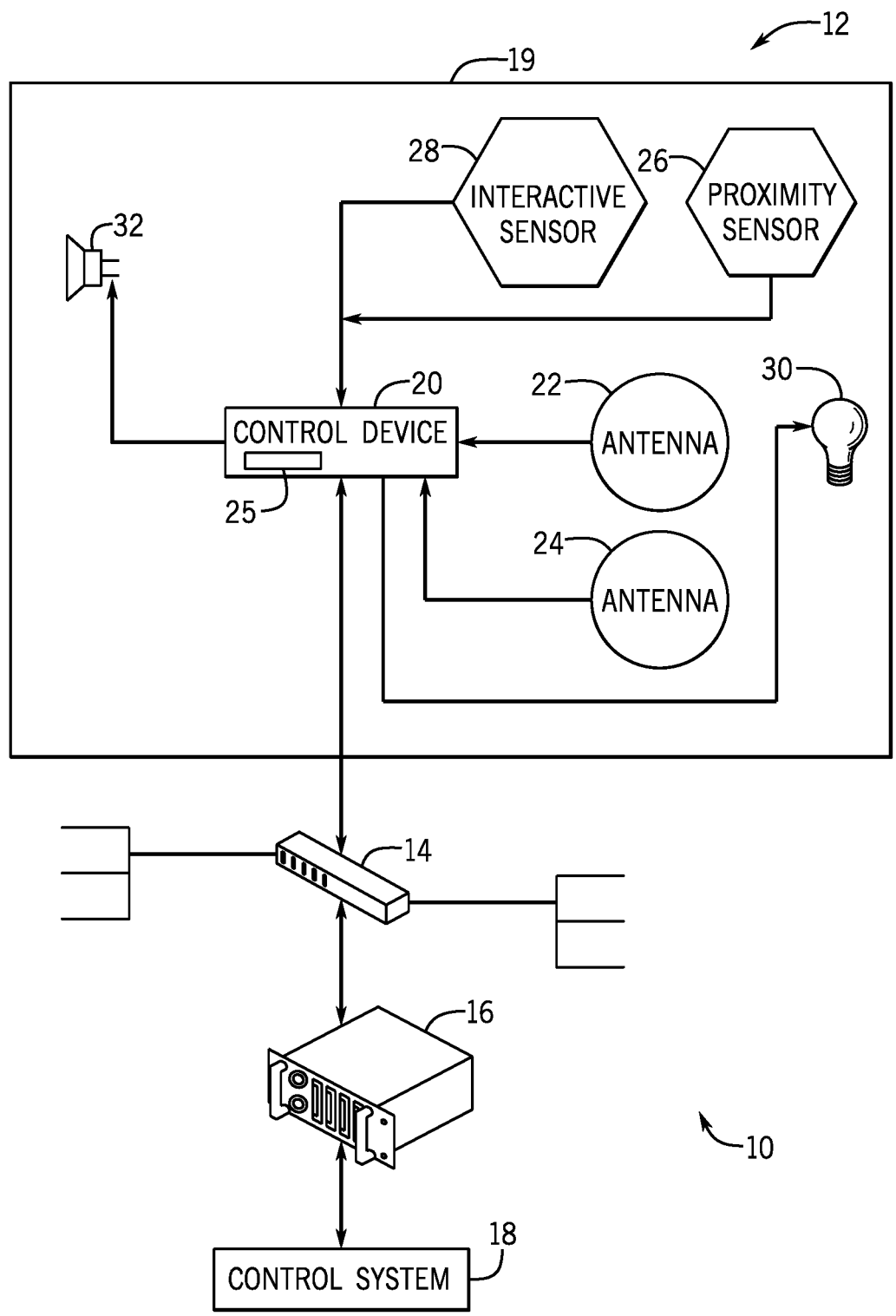
FIG. 1 is a schematic of an embodiment of a system that includes an interactive component for an amusement park, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. The different types of entertainment may include features that enhance a guest's experience at the amusement park. For example, an interactive component may detect a guest's interaction and generate effects based on the interaction.

Embodiments of the present disclosure are directed to an improved interactive component that may be utilized at an amusement park. The interactive component may enable guests of the amusement park to physically interact with a portion of the interactive component (e.g., a surface, a button, a sensor, or another suitable feature) to generate an effect. In some embodiments, the interactive component may include a cylinder, a sphere, a drum, a block, a cube, or other suitable shape that may be activated upon physical contact by a guest. For example, the interactive component may include a surface having a relatively soft, flexible, or plush material that a guest may physically contact (or contact with an object). Upon physical contact with the surface, a sensor of the interactive component may detect the interaction and send feedback to a control device, which may activate an effect. The effect may include generating a sound, generating a display, rewarding the guest a score related to a park-wide competition, rewarding the guest a score related to a personalized competition for the guest, another suitable effect, and/or a combination thereof.

In some embodiments, the interactive component is configured to detect a guest as the guest approaches the interactive component. Accordingly, the interactive component may generate an effect (or otherwise prepare for an interaction) as the guest comes into close proximity to the interactive component and/or before the guest physically interacts with the interactive component. Further, the interactive component may be configured to detect an identity of the guest via an identification tag (e.g., an RFID tag or a device carried by the guest) carried by and associated with the guest. As such, the interactive component may generate an effect personalized to the guest and/or award points to the particular guest that interacts with the interactive component. In any case, multiple interactive components may be positioned throughout the park, such that guests may seek a specific interactive component and physically contact the interactive component upon its discovery. Accordingly, guests that are not otherwise engaged (e.g., riding a roller coaster or watching a performance) may interact with the interactive component to enhance an experience of the guest while at the amusement park (e.g., in a common area, in a queue, or in a dedicated interactive space).

Turning to the figures, FIG. 1 illustrates an embodiment of a schematic of a system 10 (e.g., an entertainment system) that includes an interactive component 12 for an amusement park. As shown in the illustrated embodiment of FIG. 1, the system 10 includes a network 14, which may be utilized throughout the amusement park. In some embodiments, the network 14 may enable communication between the interactive component 12 and other components and/or devices in the amusement park. For example, in some embodiments, the network 14 is a wireless communication system that sends and receives wireless signals from a plurality of devices in the amusement park via Wi-Fi, Bluetooth, another suitable wireless communication technique, or a combination thereof. In any case, the interactive component 12 may communicate with one or more components or devices of the amusement park through the network 14.

For example, the interactive component 12 may be communicatively coupled to a server 16 via the network 14, such that the server 16 may send, receive, and/or store data and information from the interactive component 12. For example, the data and information sent and/or received from the interactive component 12 may be personal to a particular guest of the amusement park because the interactive component 12 may identify a particular guest (e.g., via an RFID tag assigned to and transported by the particular guest) and associate interaction with the interactive component 12 to the particular guest. As such, in some embodiments, the server 16 sends the data and information from the interactive component 12 to a control system 18, which may ultimately cause the data or information from the interactive component 12 to be displayed at a particular location in the amusement park (e.g., a scoreboard, one or more monitors).

Additionally or alternatively, the control system 18 may send a signal back to the interactive component 12 to generate a personalized effect (e.g., displaying an image or movie, illuminating lights, generating sound) for the particular guest. For example, guests of the amusement park may fill out a survey and/or otherwise choose various interests, which may be stored in a guest profile (e.g., on the server 16). The guest profile may be associated with an identification tag (e.g., RFID tag) of the guest, such that the interactive component 12 chooses from a plurality of available effects and generates an effect suitable for the guest based on the guest profile when the identification tag is detected during an interaction with the interactive component 12. As a non-limiting example, the guest may identify a particular interest in dinosaurs. As such, the interactive component may detect the guest (e.g., via the RFID tag) and generate audio of a dinosaur roar when the guest physically contacts the interactive component 12.

As shown in the illustrated embodiment of FIG. 1, the interactive component 12 may include various hardware disposed in a housing 19, which enable the interactive component 12 to detect the guest, detect interaction initiated by the guest, and/or generate the effect. For example, the interactive component 12 includes a control device 20. The control device 20 may be communicatively coupled to the control system 18 (e.g., the control system 18 of the amusement park) via the network 14. Further, the control device 20 may be coupled to a first antenna 22 (e.g., an ultra high frequency (UHF) antenna) and/or a second antenna 24 (e.g., a nearfield communication (NFC) antenna), which may be configured to detect and/or identify the guest in combination with transceivers 25 (e.g., RFID transceivers). In some embodiments, the transceivers 25 (e.g., UHF transceivers or NFC transceivers) and the control device 20 are an integral unit. As such, the first antenna 22, the second antenna 24, and/or the transceivers 25 may be referred to as a detection device for detecting and/or identifying guests. For example, the first antenna 22, the second antenna 24, and/or the transceivers 25 may emit electromagnetic waves (e.g., long range and/or short range radio communications) that are received by an identification tag (e.g., an RFID tag or guest device) associated with a particular guest. As such, the first antenna 22, the second antenna 24, and/or the transceivers 25 may identify the particular guest (and the associated guest profile) by communicating with the identification tag (e.g., a radio frequency identification (RFID) tag or other suitable identification device that is disposed on a wrist band, a wearable badge, a handheld or mobile device, an identification card, another suitable identification component (e.g., a themed prop), or a combination thereof) when the particular guest is positioned a threshold distance from the interactive component 12. In some embodiments, the threshold distance for the first antenna 22 is different from the threshold distance for the second antenna 24, such that the first antenna 22 and the second antenna 24 communicate with the identification tag when it is positioned at different distances from the interactive component 12.

In some embodiments, the identification tag may include a UHF RFID tag component and a nearfield communication RFID tag component, such that the first antenna 22 (e.g., a UHF antenna) and the second antenna 24 (e.g., an NFC antenna) may communicate with the identification tag at different ranges either separately or simultaneously. Further, the transceivers 25 (e.g., transmitter) may transmit data and/or information to the identification tag based on interaction with the interactive component 12 by the guest associated with the identification tag. For example, when the guest is detected to be within a threshold distance of the interactive component 12, the transceivers 25 may send data to the guest signaling that the guest is approaching the interactive component 12 and/or notifying the guest that a point has been earned for reaching the interactive component 12.

In some embodiments, each guest may wear a wristband that includes a radio frequency identification (RFID) tag. As used herein, the RFID tag may include an electronic circuit and an antenna disposed over the electronic circuit to send and/or receive signals to and/or from the first antenna 22, the second antenna 24, and/or the transceivers 25. As such, the first antenna 22, which may be a UHF antenna, and a first transceiver 25 (e.g., a first RFID transceiver) detect the RFID tag of a guest when the guest is within a range of the first antenna 22 and the first transceiver 25. Accordingly, the control device 20 may identify the guest, such that a personalized effect may be generated and/or a score awarded to the guest. Further, the second antenna 24, which may be an NFC antenna, and a second transceiver 25 (e.g., a second RFID transceiver) detect the RFID tag of the guest when the guest is in relatively close proximity to the interactive component 12 (e.g., within 50 centimeters). In some embodiments, the second antenna 24 and the second RFID transceiver 25 detect that the guest is in close proximity to the interactive component 12 and generate the effect without the guest physically contacting the interactive component 12 or based on the signal and not contact. Additionally or alternatively, the first antenna 22, the second antenna 24, and/or the transceivers 25 may reprogram or update the RFID tag of the guest to reflect that the guest interacted with a particular interactive component 12 in the amusement park.

In some embodiments, the interactive component 12 may include a proximity sensor 26, which may be configured to detect a proximity of the guest to (e.g., a distance from) the interactive component 12 (e.g., in addition to or in lieu of an NFC antenna and transceiver). For example, the proximity sensor 26 may send feedback to the control device 20 indicative of a position of a guest relative to the interactive component 12. In some embodiments, the control device 20 may actuate an effect when the guest is within a predetermined distance relative to the interactive component 12. As a non-limiting example, the control device 20 may send a signal to illuminate a light (e.g., one or more light emitting diodes (LEDs) in the shape of an arrow pointing to an interactive surface) that may provide instructions to the guest on how to interact with the interactive component 12. Additionally, the control device 20 is coupled to an interactive sensor 28, which is utilized to detect interaction of the guest with the interactive component. For example, the interactive sensor 28 may include an impact sensor, such as an accelerometer or a piezoelectric sensor. The interactive sensor 28 may thus detect contact between the guest and the interactive component 12 and send a signal to the control device 20 to initiate an effect.

In some embodiments, the interactive component 12 may include a visual effect device 30 (e.g., lights, a monitor) and/or an audio effect device 32 (e.g., a speaker). As such, the control device 20 of the interactive component 12 may activate the visual effect device 30 and/or the audio effect device 32 based on the detected interaction and/or the particular guest that initiated the interaction. In some embodiments, the control device 20 actuates a particular effect using the visual effect device 30 and/or the audio effect device 32 regardless of the particular guest that initiates the interaction (e.g., via the interaction sensor 28). In other embodiments, the control device 20 may create a personalized effect by actuating the visual effect device 30 and/or the audio effect device 32 based on the particular guest identified by the interactive component 12 (e.g., via the RFID tag). Additionally or alternatively, the control device 20 may detect interaction with the interactive component 12 and send a signal to the control system 18 (e.g., via the network 14) to award the particular guest a score. As such, the control system 18 may send one or more signals to display the score of the particular guest in predetermined locations around the amusement park.

Further still, the control system 18 may be configured to control a timing of actuation of the visual effect device 30 and/or the audio effect device 32. For example, in some cases, the interactive component 12 includes an active state that enables the interactive component 12 to generate the effect (e.g., activate the visual effect device 28, activate the audio effect device 30, and/or award the guest a point) and an inactive state where the interactive component 12 may not generate the effect despite interaction with the interactive component 12 by the guest. As such, the control system 18 may be configured to activate the visual effect device 30, the audio effect device 32, and/or another suitable device within the interactive component 12 to notify guests of the amusement park when the interactive component is in the active state and/or the inactive state. The interactive component may enter the inactive state for a predetermined period of time (e.g., 1 minute, 5 minutes, 10 minutes, 30 minutes, 1 hour, or more than 1 hour) after the interactive component 12 detects interaction with the interactive component 12. After the predetermined period of time, the control system 18 may send a signal to the interactive component 12 to provide an indication (e.g., a green light) that the interactive component 12 is in the active state. In still further embodiments, the interactive component 12 may include a semi-active state where the interactive component 12 activates the visual effect device 30 and/or the audio effect device 32, but does not reward the guest with a score upon interaction with the interactive device 12.

Figure 2:
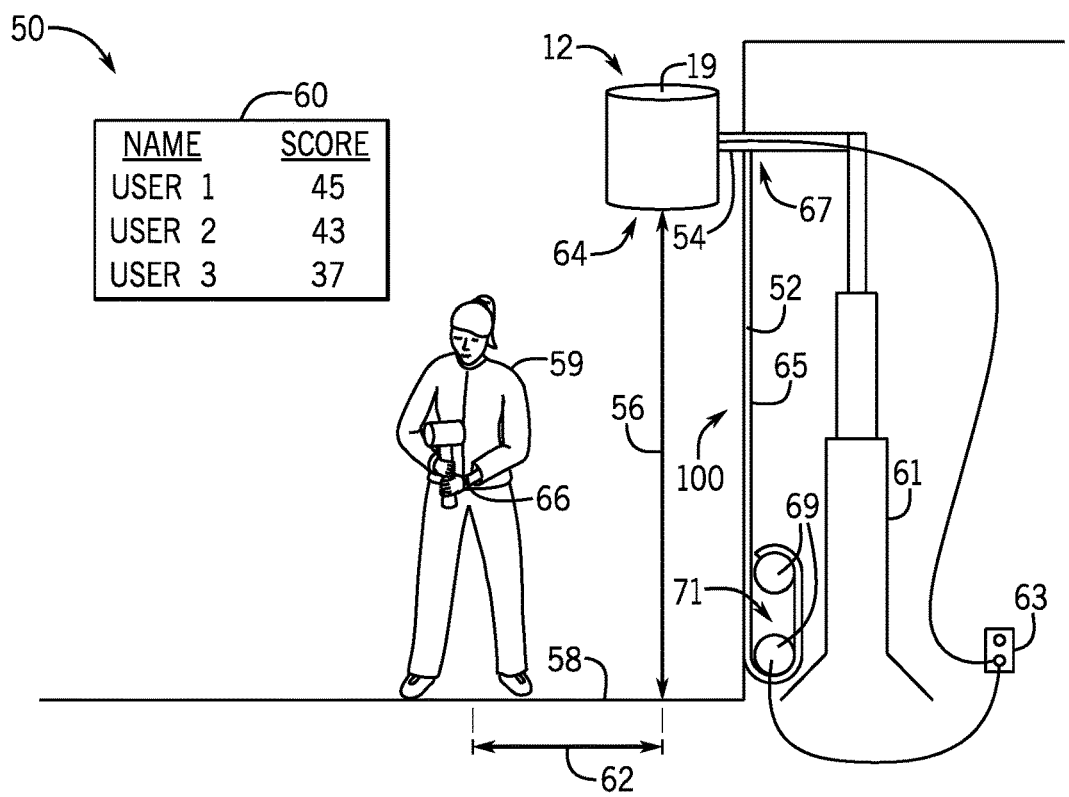
FIG. 2 illustrates an embodiment of an environment of the amusement park having the interactive component of FIG. 1, in accordance with an aspect of the present disclosure.

FIG. 2 illustrates a schematic of an embodiment of the interactive device 12 positioned within an environment 50 of the amusement park. As shown in the illustrated embodiment, the interactive component 12 is mounted to a structural support 52 (e.g., a wall, a beam, a structure) of the amusement park by a mounting device 54. As shown in the illustrated embodiment of FIG. 2, the structural support 52 is a wall within the amusement park. In some embodiments, the mounting device 54 is a truss mount that secures the interactive component 12 in a substantially fixed position in the amusement park. As shown in the illustrated embodiment of FIG. 2, the interactive component 12 may be positioned at a height 56 from a floor 58 of the amusement park (e.g., the ground). The height 56 may be predetermined based at least on an average height of guests to the amusement park (or an average height of people in a region proximate to the amusement park). For example, in some embodiments, the height 56 may be between 0.1 and 1 meter greater than the average height of guests to the amusement park, between 0.2 and 0.75 meters greater than the average height of guests to the amusement park, or between 0.25 and 0.5 meters greater than the average height of guests to the amusement park. Increasing the height 56 beyond the average height of guests to the amusement park may enable guests to jump to interact with the interactive component 12 (e.g., to physically contact a bottom surface of the interactive component). However, in other embodiments, the height 56 may be at the average height of guests to the amusement park, less than the average height of guests to the amusement park, or any other suitable height (see, e.g., FIG. 4).

In some embodiments, the height 56 may be adjustable based on a height of a guest 59 included in a guest profile associated with the identification tag by a height adjustment feature. For example, the mounting device 54 may be coupled to a telescoping beam 61, which may adjust the height 56 of the interactive component 12 based on a height of the guest 59. The telescoping beam 61 may be coupled to the control device 20, such that the telescoping beam 61 may be actuated by the control device upon receiving height information of the guest 59 upon detection of the identification tag. As shown in the illustrated embodiment of FIG. 2, the telescoping beam 61 may be coupled to a power supply 63, which provides power to a motor or other device configured to raise and lower the telescoping beam 61. The mounting device 54 extends through the wall 52 via a slot 100. In some embodiments, at least a portion of the slot 100 may be covered by an adjustable partition 65, which substantially blocks a viewpoint of the guest 59 through the slot 100 and/or substantially blocks the guest 59 from accessing components in the slot 100. The adjustable partition 65 may be coupled to the mounting device 54 at a first end 67 and disposed on one or more rollers 69 at a second end 71. The rollers 69 may enable the adjustable partition 65 to adjust in length as the mounting device 54 (and thus the interactive component 12) move as a result of the telescoping beam 61. In some embodiments, the rollers 69 include a motor or actuator configured to dispense or wind up the adjustable partition 65 as the mounting device 54 moves to adjust the height 56.

As discussed above, guest interaction with the interactive component 12 may award points to an account of the guest 59. As shown in the illustrated embodiment of FIG. 2, the environment 50 includes a display 60 that includes scores of guests that interact with the interactive component 12. For example, the display 60 may be a leaderboard that displays guests having the top scores over a predetermined amount of time (e.g., a day, a week, a month, a year, all-time). While the illustrated embodiment of FIG. 2 shows the display 60 having three guest scores, in other embodiments, the display 60 may show one, two, four, five, six, seven, eight, nine, ten, or more than ten guests and the respective scores of the guests. In still further embodiments, the display 60 may be configured to scroll through pages of scores listing the guests and the corresponding scores of the guests. In such embodiments, the scores of all guests participating and interacting with the interactive components 12 may be displayed.

In some embodiments, the interactive component 12 is configured to generate an effect upon detecting a guest via the proximity sensor 26, for example. The interactive component 12 may detect that the guest is within a predetermined distance 62 from the interactive component 12 using the first antenna 22, the second antenna 24, the transceivers 25, and/or the proximity sensor 26 and generate an effect (e.g., to draw the guest's attention to the interactive component 12). In some cases, the effect may instruct the guest to contact the interactive component 12 in a specific location. For example, a surface 64 (e.g., a contact surface or an impact surface) of the interactive component 12 may include a relatively plush or flexible surface for the guest to contact with a hand or an object (e.g., a toy hammer or sword). While the illustrated embodiment of FIG. 2 shows the surface 64 as being the lowermost surface of the interactive component 12 with respect to the floor 58, the surface 64 may be positioned on any suitable face of the interactive component 12 in accordance with present embodiments. In some embodiments, the proximity sensor 26 sends a signal to the control device 20 indicating a position of a guest relative to the interactive component 12. Accordingly, the control device 20 sends a signal to the visual effect device 30 (e.g., one or more LEDs) that provide a visual cue to the guest to instruct the guest how to properly interact with the interactive component 12. As a non-limiting example, the visual effect device 30 may include a plurality of LEDs in the shape of an arrow, which points to the surface 64 instructing the guest to physically contact the surface 64.

Further, as discussed above, the interactive component 12 may detect a particular guest via an identification tag 66 (e.g., an RFID tag) associated with the guest. As shown in the illustrated embodiment of FIG. 2, the identification tag 66 may be included on a wearable component that is worn by the guest around the wrist. In other embodiments, the identification tag 66 may be included on a handheld device (e.g., a cell phone or other electronic device), an identification badge, an identification card, an identification object carried by the guest, or any other suitable component that may communicate with the first antenna 22, the second antenna 24, and the transceivers 25. Accordingly, the interactive component 12 may determine the identity of the guest and therefore generate a personalized effect for the guest (e.g., based on preferences of the guest included in a guest account or profile) and/or reward a score (e.g., point) to the particular guest associated with the identification tag 66.

Figure 3:
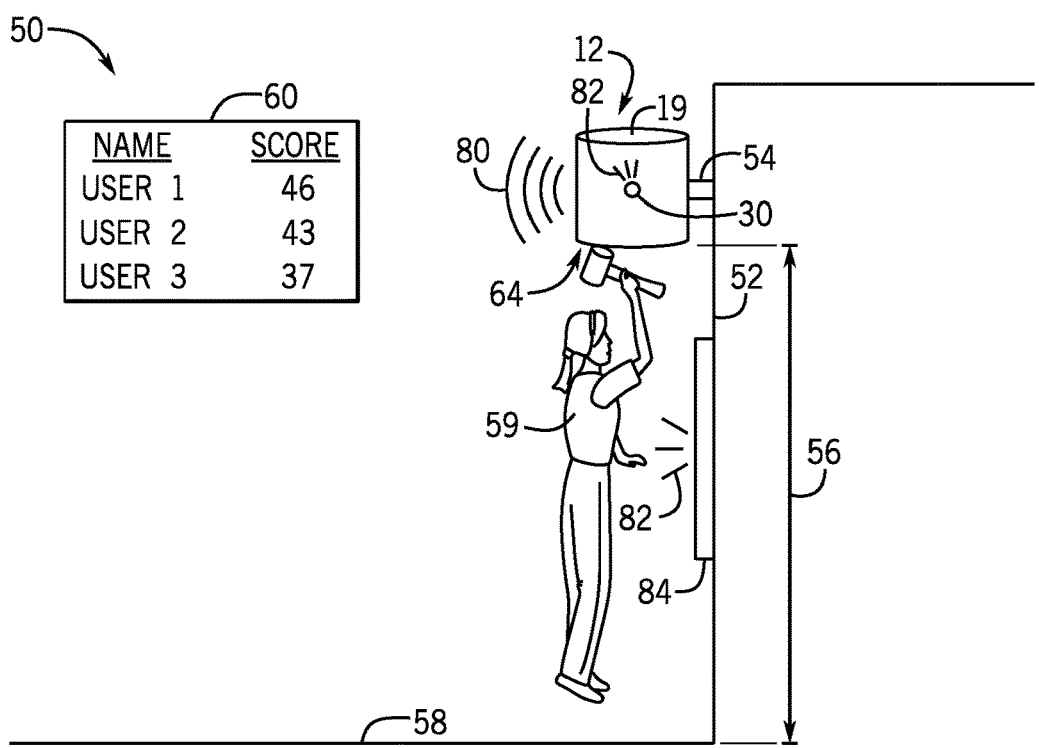
FIG. 3 illustrates an embodiment of the environment of the amusement park having the interactive component of FIG. 1 and a guest interacting with the interactive component, in accordance with an aspect of the present disclosure.

In some embodiments, the guest 59 physically contacts a portion of the interactive component 12 (e.g., the surface 64) to actuate an effect. For example, FIG. 3 illustrates an embodiment of the environment 50 and the guest 59 interacting with the interactive component 12. As shown in the illustrated embodiment of FIG. 3, the guest may physically contact the surface 64 (or another suitable portion of the interactive component 12) to generate an effect. As discussed above, the interactive component 12 of FIG. 1 includes the interactive sensor 28, which may include an accelerometer or a piezoelectric sensor. The interactive sensor 28 may detect contact by the guest 59 via vibrations of the surface 64 and/or other movement of the surface 64 caused when the guest 59 contacts the surface 64. The interactive sensor 28 may send feedback to the control device 20 indicative of the contact by the guest 59. The control device 20 may then send a signal to the visual effect device 30 and/or the audio effect device 32 to generate an effect. In other embodiments, the visual effect device 30 and/or the audio effect device 32 may generate the effect upon feedback from the second antenna 24 (e.g., an NFC antenna) and the second transceiver 25 that the guest is within close proximity to the interactive sensor 28. In such embodiments, the guest may not physically contact the interactive component 12 to generate the effect.

As shown in the illustrated embodiment of FIG. 3, the interactive component 12 generates sound 80 (e.g., via the audio effect device 32) when the guest contacts the surface 64. Additionally or alternatively, the interactive component 12 may create a visual effect 82 via a monitor 84 and/or the visual effect device 30. As discussed above, the sound 80 and/or the visual effect 82 may be personalized to the specific guest 59 that contacts the interactive component 12. In some cases, the sound 80 and/or the visual effect 82 generated may be based on a profile of the guest 59 that is linked to the identification tag 66 of the guest 59. The guest 59 may select various preferences or identify themes which interest the guest. Accordingly, the sound 80 and/or the visual effect 82 may relate to the preferences and/or themes identified by the guest. Further, the interactive component 12 may add a point to the display 60 to show that the guest has contacted the interactive component 12.

Figure 4:
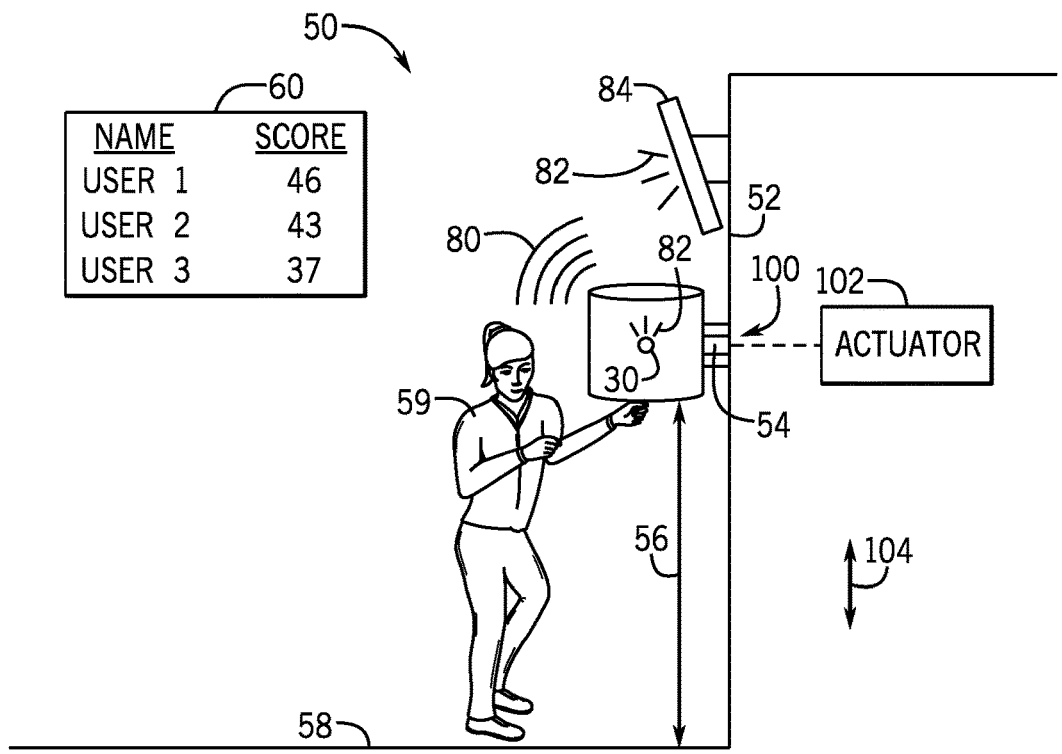
FIG. 4 illustrates an embodiment of the environment of the amusement park having the interactive component of FIG. 1, in accordance with an aspect of the present disclosure.

As shown in the illustrated embodiment of FIG. 3, the height 56 of the interactive component 12 is such that the guest jumps from the floor 58 to contact the surface 64 of the interactive component 12. However, in other embodiments, the height 56 may be reduced to facilitate guest interaction with the interactive component 12. For example, FIG. 4 illustrates an embodiment of the environment 50 where the height 56 is reduced to facilitate the guest interaction. In some embodiments, the interactive component 12 may be movable with respect to the wall 52. As such, the height 56 of the interactive component 12 may be modified to a particular height that is suitable for the guest. In some embodiments, the guest may be identified by the interactive component 12 using the identification tag 66, the first antenna 22, the second antenna 24, and/or the transceivers 25. Personal information related to the guest, such as a height of the guest, may be included in a guest profile associated with the identification tag 66. The interactive component 12 may thus determine the height of the guest 59 and adjust the height 56 of the interactive component to a suitable distance from the floor 58 based on the height of the guest 59.

To enable adjustment of the height 56, the mounting device 54 may be disposed in the slot or groove 100 along the wall 52. The mounting device 54 may also be coupled to an actuator 102 (e.g., the telescoping beam 61) that is configured to direct the mounting device 54, and thus the interactive component 12, along an axis 104 to adjust the height 56. In some embodiments, the actuator 102 may include the telescoping beam 61 and/or a circuit or belt that rotates to adjust a position of the interactive component 12 along the wall 52. Therefore, the height 56 may be modified to accommodate guests of various heights. Further, as discussed above, the adjustable partition 65 may be configured to cover the slot 100 as the mounting device 54 (and thus the interactive component 12) moves along the axis 104.

Figure 5:
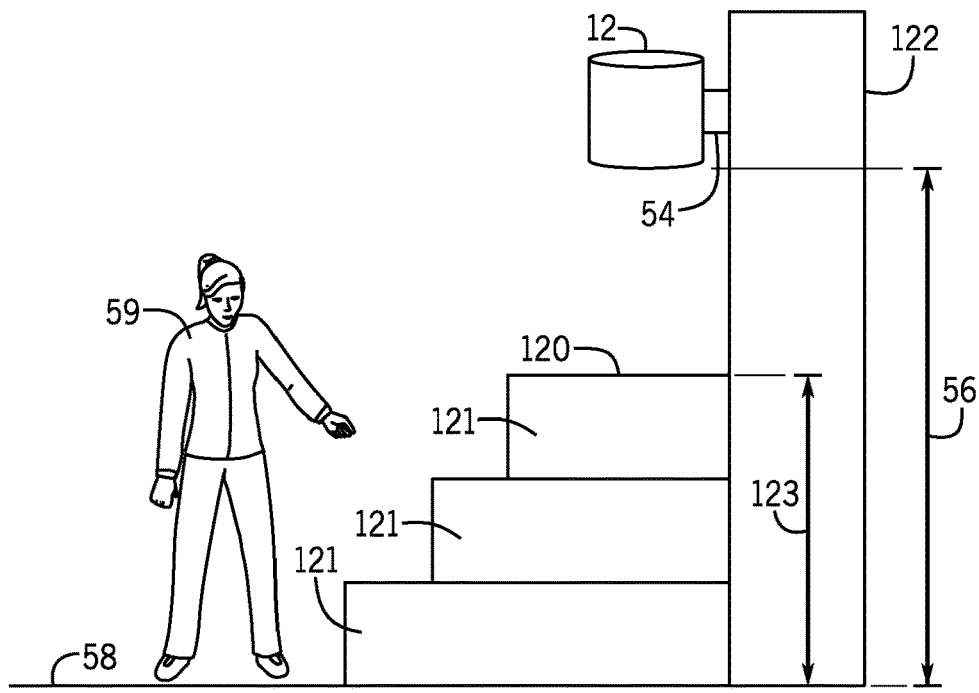
FIG. 5 illustrates an embodiment of the environment of the amusement park having the interactive component of FIG. 1, in accordance with an aspect of the present disclosure.

In other embodiments, the environment 50 may include a position component 120 (e.g., steps, a ladder, a sloped surface, or another suitable component), which may enable guests to step or climb upwards toward the interactive component 12. For example, FIG. 5 illustrates an embodiment of the environment 50 having the position component 120. Accordingly, guests may utilize the position component 120 to reach the interactive component 12 regardless of the height of the guest 59. The position component 120 may also be adjustable to further enable guests to reach the interactive component 12. For example, the position component 120 may include automated stackable components 121 that may increase or decrease a height 123 of the position component 12. In some embodiments, the interactive component 12 may be coupled to another structure of the amusement park instead of the wall 52. For example, as shown in the illustrated embodiment of FIG. 5, the interactive component 12 is mounted to a beam 122 that may be secured within the ground 58. The beam 122 may also be adjustable to adjust the height 56 of the interactive component 12 (e.g., in addition to or in lieu of the position component 120). For example, the beam 122 may include a telescoping configuration that enables the beam 122 to adjust the height 56 of the interactive component 12. The telescoping configuration of the beam 122 may enable the height 56 to be adjusted manually (e.g., an operator physically move the beam 122 to adjust the height 56) or mechanically using an actuator (e.g., a motor). In other embodiments, the interactive component 12 may be mounted to any suitable structural or fixed component within the amusement park.

Figure 6:
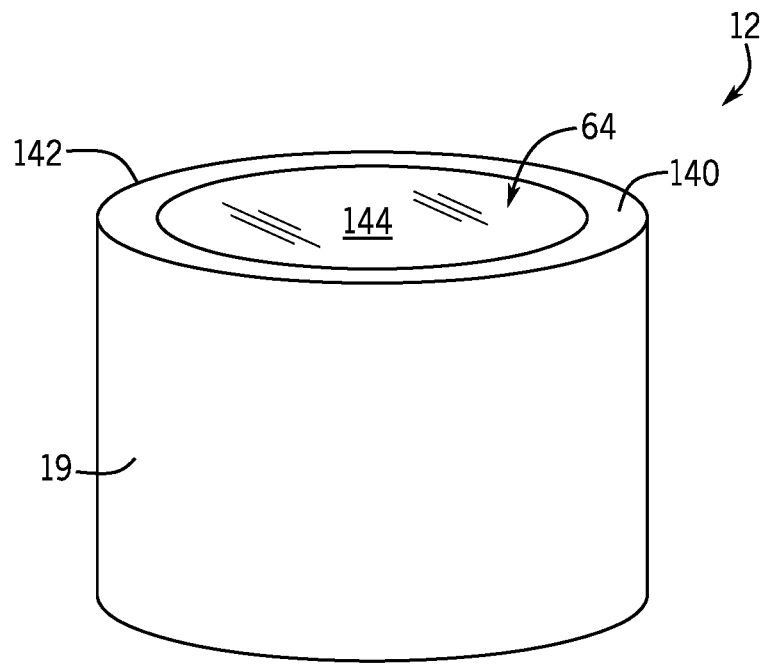
FIG. 6 is a perspective view of an embodiment of the interactive component of FIGS. 1-5, in accordance with an aspect of the present disclosure.

As discussed above, guests may physically contact the interactive component 12 to generate the effect and/or receive a score. The surface 64 of the interactive component 12 may include features that provide comfort to the guests upon physical contact. For example, FIG. 6 illustrates a perspective view of the interactive component 12 and the housing 19 of the interactive component 12. As shown in the illustrated embodiment of FIG. 6, the surface 64 includes lining 140 along an edge 142 of the surface 64 to provide a resilient cushion upon impact by the guest. In other embodiments, the edge 142 of the surface 64 may be formed as rounded or smooth edges to facilitate interaction with the interactive component 12 by the guest. The surface 64 may also include a resilient material 144 (e.g., silicone, rubber, another polymeric material) that may vibrate and/or otherwise move when contacted by the guest. Accordingly, the interactive sensor 128 may detect such vibrations and/or movement to determine that the guest has interacted with the interactive component 12. In some embodiments, the surface 64 may also include a structural layer that reinforces the surface 64 to increase a robustness of the surface 64. While the illustrated embodiment of FIG. 6 shows the interactive component 12 as having a substantially cylindrical shape, it should be recognized that the interactive component 12 may include any suitable shape such as substantially spherical, substantially cubed, or another prismatic shape.

Figure 7:
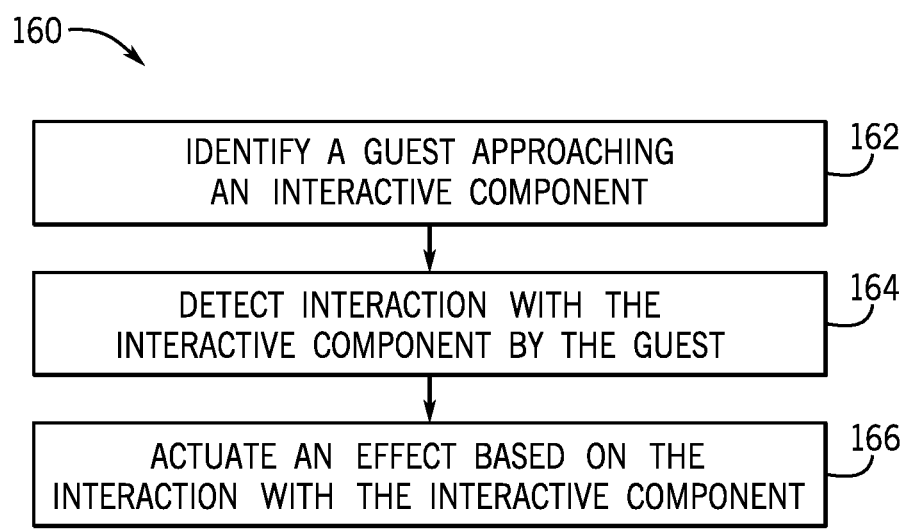
FIG. 7 is a flow chart of an embodiment of a process for using the interactive component of FIGS. 1-6, in accordance with an aspect of the present disclosure.

FIG. 7 is a flow chart of an embodiment of a process 160 that may be utilized by the control device 20 of the interactive component 12 to receive input and generate the effect. At block 162, the interactive component 12 may identify the guest approaching the interactive component 12 using the identification tag 66, first antenna 22, the second antenna 24, and/or the transceivers 25. For example, the first antenna 22, the second antenna 24, and/or the transceivers 25 may identify the guest by detecting the identification tag 66 that the guest may be wearing and/or holding. The identification tag 66 may be associated with a guest profile or account, which the control device 20 may identify. As such, the interactive component 12 may generate a personalized effect and/or award a score to the guest based on the guest profile or account. Further, the second antenna 24 (e.g., an NFC antenna) and the second transceiver 25 and/or the proximity sensor 26 may be utilized to detect that the guest is approaching the interactive component 12 to actuate one or more devices or effects that instruct the guest how to interact with the interactive component (e.g., LEDs in the shape of an arrow pointing toward the surface 64).

At block 164, the interactive component 12 may detect that the guest has interacted with the surface 64. As discussed above, the interactive sensor 28 may detect vibrations and/or movement of the surface 64 and send feedback to the control device 20 indicative of the interaction. Additionally or alternatively, the second antenna 24 and the second transceiver 25 detect that the guest is in close proximity to the interactive component 12 and send feedback to the control device 20. Accordingly, the control device 20 may send one or more signals to devices of the interactive component 12 to generate an effect, as shown at block 166. For instance, the control device 20 may send a signal to the visual effect device 30 and/or a signal to the audio effect device 32 to generate the effect. Additionally or alternatively, the effect may include awarding points to the guest for interacting with the interactive component 12. Accordingly, the control device 20 may communicate with the control system 18 (e.g., via the network) to award the points to the guest. The points may then be displayed on the display 60 and/or in another location in the amusement park.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An entertainment system including an interactive component for an amusement park, wherein the interactive component comprises:
   a detection device disposed within a housing and configured to read an identification tag via long range and short range radio communications;
   an interactive sensor disposed within the housing and configured to detect physical interaction with a surface of the interactive component, wherein the surface comprises a flexible material, and wherein the interactive sensor is configured to detect movement of the surface;
   a control device communicatively coupled to the detection device and the interactive sensor, wherein the control device is configured to receive feedback from the detection device and the interactive sensor; and
   an effect device configured to receive a signal from the control device and to generate an effect based on detection of the physical interaction with the surface of the interactive component; and
   a transmitter configured to transmit data to the identification tag based on detection of the physical interaction with the surface of the interactive component by the interactive sensor while detecting the identification tag within a threshold distance of the interactive component by the detection device.

2. The entertainment system of claim 1, wherein the interactive sensor comprises an accelerometer, or a piezoelectric sensor, or both, and wherein the interactive sensor is disposed proximate to the portion of the interactive component.

3. The entertainment system of claim 1, wherein the detection device comprises an ultra-high frequency (UHF) antenna configured to detect a UHF radio frequency identification (RFID) tag of the identification tag and a nearfield communication antenna configured to detect a nearfield communication RFID tag of the identification tag.

4. The system of claim 1, wherein the detection device comprises an ultra-high frequency transceiver, and wherein the ultra-high frequency transceiver and the control device are an integral unit.

5. The entertainment system of claim 1, wherein the effect device comprises a visual effect device, or an audio effect device, or both.

6. The entertainment system of claim 5, wherein the visual effect device comprises a monitor.

7. The entertainment system of claim 5, wherein the audio effect device comprises a speaker.

8. The entertainment system of claim 1, wherein the control device is configured to communicatively couple to a control system of the amusement park, wherein the control device is configured to award a point to an account associated with the identification tag upon detection of the interaction with the surface of the interactive component while detecting the identification tag within a threshold distance of the interactive component.

9. The entertainment system of claim 8, comprising the control system of the amusement park, wherein the control system of the amusement park is configured to display the point awarded on a display positioned in the amusement park.

10. The entertainment system of claim 1, wherein the interactive component is configured to be mounted to a structural support of the amusement park using a mounting component.

11. The entertainment system of claim 10, wherein the structural support comprises a height adjustment feature configured to move the interactive component based on user characteristics stored in a database and associated with the identification tag.

12. The entertainment system of claim 11, wherein the control device is configured to set an adjustment height of the height adjustment feature based on the user characteristics in response to the detection device detecting the identification tag.

13. A system, comprising:
   an interactive component disposed in an environment of an amusement park, the interactive component comprising:
      a detection device configured to communicate with a guest identification tag;

an interactive sensor configured to detect a physical proximity from and/or interaction with a surface of the interactive component;

a control device communicatively coupled to the detection device and the interactive sensor, configured to receive feedback from the detection device and the interactive sensor, and to award a point to a guest profile associated with the guest identification tag upon detection of the interaction with the surface of the interactive component by the interactive sensor and detection of the guest identification tag being within a threshold proximity by the detection device, wherein the surface of the interactive component comprises a flexible material, and wherein the interactive sensor is configured to detect movement of the surface; and an effect device configured to receive a signal from the control device to generate an effect upon detection of the interaction with the surface of the interactive component by the interactive sensor;

a display disposed in the environment of the amusement park; and a control system of the amusement park communicatively coupled to the control device of the interactive component, wherein the control system is configured to send one or more signals to the display to display information based on the point awarded to the guest profile.

14. The system of claim 13, wherein the display is configured to show top scores of a predetermined number of guests of the amusement park.

15. The system of claim 13, wherein the interactive sensor comprises an accelerometer, or a piezoelectric sensor, or both, and wherein the interactive sensor is disposed proximate to the surface of the interactive component.

16. The system of claim 13, wherein the effect generated by the effect device is personalized to the guest profile based on preferences identified in the guest profile.

17. A method, comprising:

identifying, using a detection device, a guest device approaching an interactive component disposed in an environment of an amusement park;

detecting, using an interactive sensor, interaction with a surface of the interactive component associated with the identified guest device while detecting, using the detection device, a presence of the guest device within a threshold distance relative to a point of the interactive component, wherein the surface comprises a flexible material, and wherein the interactive sensor is configured to detect movement of the surface; and generating, using an effect device, an effect based on the detected interaction with the surface of the interactive component associated with the identified guest device while detecting the presence of the identified guest device within the threshold distance relative to the point of the interactive component.

18. The method of claim 17, comprising setting an adjustment height of the interactive component using a height adjustment feature based on user characteristics determined from a guest profile associated with the guest device.

19. The method of claim 18, wherein setting the adjustment height of the interactive component comprises adjusting a height of a telescoping beam coupled to a mounting device of the interactive component.

20. The method of claim 17, comprising:

detecting, using the detection device or a proximity sensor, a proximity of the guest device to the point of the interactive component; and actuating, using the effect device, an additional effect indicating how to interact with the surface of the interactive component when the guest device is within a predetermined distance from the point of the interactive component, wherein the predetermined distance is larger than the threshold distance.

* * * * *